L. A. DREY.
DROP FEEDING DEVICE FOR GLASS MACHINES.
APPLICATION FILED DEC. 14, 1914.

1,146,694.

Patented July 13, 1915.

ATTEST:
R. L. Orwig
E. L. Wallace

INVENTOR
LEO A. DREY,
By Higdon & Longan ATTYS.

UNITED STATES PATENT OFFICE.

LEO A. DREY, OF ST. LOUIS, MISSOURI.

DROP-FEEDING DEVICE FOR GLASS-MACHINES.

1,146,694. Specification of Letters Patent. Patented July 13, 1915.

Application filed December 14, 1914. Serial No. 877,070.

*To all whom it may concern:*

Be it known that I, LEO A. DREY, a citizen of the United States, and resident of St. Louis, Missouri, have invented certain new and useful Improvements in Drop-Feeding Devices for Glass-Machines, of which the following is a specification containing a full, clear, and exact description, reference being had to the accompanying drawings, forming a part hereof.

My invention relates to improvements in drop feeding devices for glass machines, wherein a chamber is provided about the discharge orifice of a furnace and in conjunction therewith, forming at times one wall of the chamber, a glass cutting means, which chamber and cutting means operate conjointly to produce measured quantities of glass, confine the measured quantities during their accumulation in a chamber which is closed against the admission of outside air and which is heated by radiation from the furnace, support the measured quantities of glass during their accumulation so that all, or nearly all of the surface of each measured quantity, except its bottom is in free suspension and enveloped in heat, during its accumulation or flow from the furnace, release the support to allow the measured quantity to drop into a receptacle, such as a mold, located directly beneath the chamber, thereby causing an attenuation of the glass above the measured quantity and finally to bring the cutting means to a position closing the chamber, which cutting means in this movement operates to sever the measured quantity, at the attenuated portion referred to.

The object of my invention is to provide a heated chamber through which glass in measured quantities may be conducted without contacting with the sides of said chamber under normal conditions of operation directly to a receptacle, such as a mold, without subjecting the glass to chill and to minimize contact with the glass during its conduction from the furnace to the mold.

With this, and other objects, which will be made clear, my invention consists in certain details of the construction and arrangement of parts which will be hereinafter fully described, pointed out in my claims and illustrated by the accompanying drawing, in which—

Figure 1:
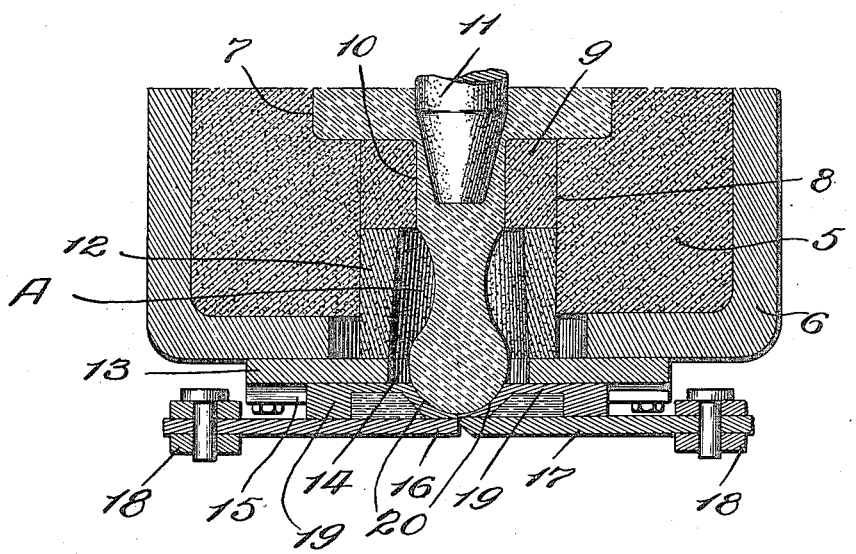
Figure 2:
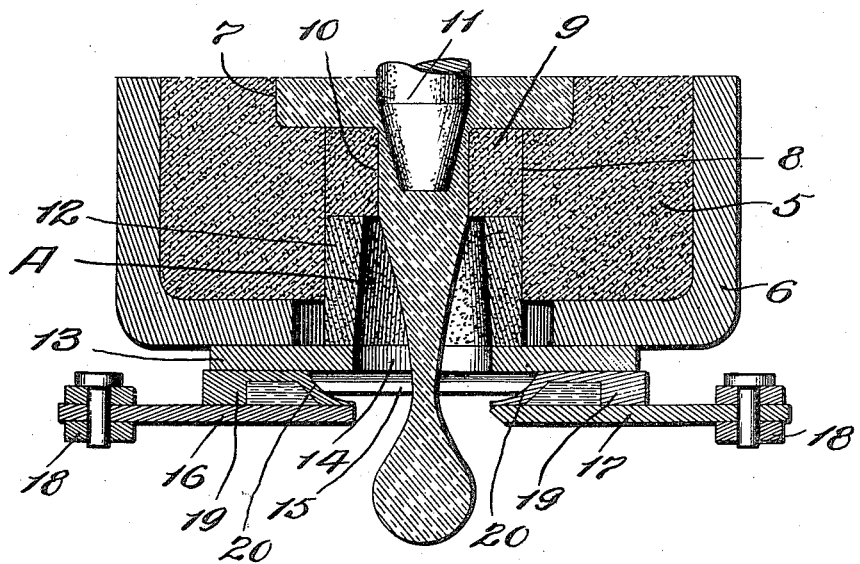

Figure 1 is a transverse, sectional elevation of a furnace boot having a means embodying my invention applied thereto, the cutting means being shown in a closed position. Fig. 2 is a view similar to Fig. 1, showing the cutting means in an open position.

Referring by numerals to the drawing, 5 designates the body of a boot, and 6 the supporting harness therefor. Formed in the bottom is a trough 7 leading from a glass tank, not shown, and formed vertically through the boot body is an opening 8, intersecting the trough. In this connection I wish to be understood that I contemplate the application of my improvements directly to furnaces, glass tanks, crucibles and analogous structures, as well as to the boot shown.

Arranged within the opening 8, at its top, next adjacent the trough 7, is a bushing 9, whose outer surface forms a glass tight joint with the opening 8 and through which a discharge orifice 10 is formed. This bushing is readily removable, as will be hereinafter explained, and its opening and length form part of the means for controlling the quantities of glass. Coöperating with this bushing is a plug 11, operable in a common manner to regulate the flow of glass through the orifice in the bushing. Arranged in the opening 8 in the boot beneath the bushing 9 is a sleeve 12 which constitutes the support for the bushing.

Secured to the harness is a head 13 having an opening 14 therethrough in registration with, but of a lesser dimension than the boot opening 8, in order that a supporting ledge be provided for the sleeve 12, and carried by the head are the parallel rails 15. Suspending from these rails is a pair of knives 16 and 17, which are arranged to slide in opposite directions between said rails, and which knives are connected with the operating arms 18.

The sleeve 12, the head 13 and the knives 16 and 17 constitute the heating chamber A, which is the prime feature of my improvements. The knives as shown are of relatively hard and soft metal and their cutting edges straight to produce butt cuts, but obviously other cutting means may be employed without departing from the spirit of my invention. Surmounting each blade is a water jacket 19 having at their meeting ends surfaces 20 which conjointly form a concaved depression which shapes the column of molten glass and in the building up or accumulating tends to hold the column and accumulated mass from the walls of the chamber.

The practical operation of the device is as follows: Assuming the glass to be in a fluid state, and freely flowing from the orifice 10, the knives are brought to a closed position. The glass commencing with its attenuated stream end is caught and accumulated in the concavity formed in the knives and is builded up into a mass having a substantially globular base and a slightly contracted neck between the base and source, which shape tends to slacken the flow of glass. During all of this accumulating period the glass is confined in a chamber having, by radiation from the furnace and the molten glass, a temperature maintaining the glass in a workable condition, with the accumulated glass in free suspension, except for the bottom of the mass, which is in contact with the knives and all of which, the surface portion of the bottom of the mass, enters into the bottom of the article free from streaks and "chill marks". At this time, that is immediately following the measuring or accumulating, the knives are by a quick movement withdrawn from beneath the mass which is dropped out of the heated chamber directly into a mold or the like therebeneath, and at the predetermined time the knives are closed.

In Fig. 2 there is illustrated the accumulated mass as after the knives are withdrawn, showing the attenuated neck of the glass column or stream. The attenuated stream portion is caught in the cavity in the knives and a succeeding measured mass accumulated in a heated confining chamber as before.

By my improved device the predetermined "gob" or "batch" of glass out of which the desired article is to be made is confined within a heated chamber (deriving its heat from the receptacle containing the molten glass) and the glass itself until it is ready to be discharged or dropped into the proper forming device, thereby providing a batch of substantially uniform temperature throughout and free from air bubbles.

While the discharge orifice, during operation, may be maintained at a uniform capacity the flow of the stream of glass varies from "free flow," at a time when the chamber bottom is in an open position, to a gradually "retarding flow" during the time the chamber bottom is closed and supporting the stream. The chamber closing means are brought together at a time when the stream is freely flowing and if it were not provided with the surfaces which conjointly form a depression the stream end would spread to and engage with the side walls of the closure, and tend to mar or chill the gathering superficially with a resultant "marked" article. The employment of the depression has an additional advantage in that it shapes the gathering to conform more nearly to the mold and hence the gathering when released will drop to the bottom of the mold, thus minimizing air bubbles in this operation, as well as facilitating the work of the plunger or other forming means. It will further be observed from Fig. 1 of the drawing that the gob of glass out of which the article is to be formed is held within the chamber in a substantially pear shaped form. This is a useful expedient in that it forms a base or bottom of the gob so as to conform to the bottom of the mold.

I claim:

1. A molten glass receptacle provided with a discharge orifice of sufficient diameter to permit the free flow of molten glass therefrom, in combination with an auxiliary chamber surrounding said orifice and extending therefrom, said chamber of sufficient diameter for its walls to be normally out of contact with the glass discharging from said orifice, and a plurality of closing members for the chamber operating to simultaneously move from beneath the lower end of the accumulated mass.

2. A molten glass receptacle, provided with a discharge orifice of sufficient diameter to permit the free flow of molten glass therefrom, an auxiliary chamber surrounding said orifice and extending therefrom, in which to receive a mass of glass discharged from said orifice, means comprising co-acting glass severing and forming elements for opening and closing the outer end of said auxiliary chamber, severing the mass of glass discharged from said opening and passing through said auxiliary chamber, and shaping the mass in the auxiliary chamber to the mold in which the article is to be formed.

3. A molten glass receptacle, provided with a discharge orifice of sufficient diameter to permit the flow of molten glass therefrom, an auxiliary chamber beneath said orifice and having a diameter sufficient for its walls to be normally out of contact with the glass issuing from said orifice, into which the glass flowing from said orifice is primarily received, and means for opening and closing the lower end of said auxiliary chamber, sustaining the glass therein and separating the mass of glass which has flowed through said auxiliary chamber from that within the chamber.

4. A molten glass receptacle provided with a discharge orifice of sufficient diameter to permit the flow of molten glass therethrough, an auxiliary chamber surrounding the orifice and of sufficient diameter for its walls to be normally out of contact with the glass issuing from said orifice, means closing the lower end of said chamber including means to support the bottom of a gob as it is collecting in said chamber, and means to sever the gob as it issues from said chamber.

5. A molten glass receptacle having a free flow discharge orifice, in combination with an auxiliary chamber below said orifice into which said orifice directly discharges by gravity and of sufficient diameter for its walls to be normally out of contact with the glass discharging from said orifice, movable means to support the bottom of the gob of glass during its accumulation, and actuating mechanism for said means.

6. The combination with a receptacle capable of holding molten glass, provided with a discharge orifice, of a chamber surrounding said orifice, and means for supporting within the chamber a substantially pear shaped gob of glass.

7. A molten glass receptacle having a discharge orifice, a heating chamber of greater cross sectional dimensions than the orifice and centrally disposed relative to a stream flowing vertically from the orifice beneath said orifice, relatively movable elements beneath the heating chamber comprising glass severing means, said means having a depression for "centering" the glass stream relative to the heating chamber.

8. A molten glass receptacle having a discharge orifice in combination with a heating chamber, of greater cross sectional dimensions than said orifice, arranged to receive a vertically flowing stream from the orifice and means for opening and closing the bottom of the heating chamber comprising glass severing means and having a depression of lesser cross sectional dimensions than said chamber to receive the stream initially and prevent its spreading to the side walls of the heating chamber, during the time the chamber bottom closing means are beneath the chamber.

9. In combination with a molten glass receptacle having a vertically disposed discharge orifice and a heating chamber of greater cross sectional dimensions than said orifice whereby a stream of glass flowing from the orifice will flow through said heating chamber without engaging its walls, of movable means beneath the heating chamber comprising glass severing means having a depression of lesser cross sectional dimensions than the heating chamber whereby to hold the stream or column of glass spaced from the walls of the heating chamber.

10. The combination with a glass receptacle having a discharge orifice; of means surrounding the discharging glass and forming a heated, quiescent gaseous envelop for the issuing glass.

11. The combination with a molten glass receptacle having a discharge orifice; of an auxiliary chamber surrounding said orifice whose upper wall is formed by said receptacle, severing and gob collecting means forming the bottom of said chamber, said chamber maintaining a quiescent heated gaseous envelop around the glass.

In testimony whereof, I have signed my name to this specification, in presence of two subscribing witnesses.

LEO A. DREY.

Witnesses:
 DAVID SOMMERS,
 A. L. SCHRAM.